US005173266A

United States Patent [19]

Kenney

[11] Patent Number: 5,173,266

[45] Date of Patent: Dec. 22, 1992

[54] SAFETY PIPET

[75] Inventor: James W. Kenney, Broomall, Pa.

[73] Assignee: Drummond Scientific Company, Broomall, Pa.

[21] Appl. No.: 382,547

[22] Filed: Jul. 19, 1989

[51] Int. Cl.$^5$ .................. G01N 1/10

[52] U.S. Cl. .................. 422/100; 422/2; 436/180; 436/810; 73/864.01; 428/34.7

[58] Field of Search .................. 422/100, 2, 41; 436/180, 810; 73/864.01; 428/34.7

[56] References Cited

U.S. PATENT DOCUMENTS

| | | | |
|---|---|---|---|
| 2,376,231 | 5/1945 | Cohn | 222/478 |
| 3,258,972 | 7/1966 | Cassaday et al. | 73/864.01 |
| 3,500,689 | 3/1970 | Band | 422/100 |
| 3,768,978 | 10/1973 | Grubb et al. | 73/864.01 |
| 3,955,020 | 5/1976 | Cavanagh et al. | 428/34.7 |
| 4,210,156 | 7/1980 | Bennett | 128/763 |
| 4,275,591 | 6/1981 | Wand | 73/864.01 |

*Primary Examiner*—Lynn M. Kummert
*Attorney, Agent, or Firm*—John F. A. Earley; John F. A. Earley, III

[57] ABSTRACT

A disposable one-time use, inexpensive, capillary-action safety micro-pipet for obtaining a sample of blood or other liquid comprises a transparent glass tube which is capable of drawing blood or other liquid into the tube by capillary action, and a resilient sheet, with an adhesive layer adhering the resilient sheet in one or more layers around the outside surface of the tube for covering the outside surface of the tube and protecting a user against being cut by any jagged edges of a broken tube.

The method of the invention comprises making a safety pipet by taking an elongated glass tube, taking a resilient sheet having an inner surface coated with a layer of adhesive, wrapping the resilient sheet around the outer surface of the tube and around inner layers of the resilient sheet, adhering the resilient sheet to the outer surface of the tube and to the inner layers of the sheet, to provide a wrapped safety glass tube in which the wrapping strengthens the tube against breaking and also protects the user against being cut by any jagged edges of a broken tube and from being infected by the contents of the tube which may be contaminated.

11 Claims, 1 Drawing Sheet

SAFETY PIPET

BACKGROUND OF THE INVENTION

1. Field of the Invention

This invention relates to pipet tubes for taking a sample of a liquid, such as blood from a drop of blood produced by a finger stick, and transferring the liquid sample to apparatus for testing the blood.

2. Description of the Prior Art

The prior art includes a glass blood collection tube which typically is about 3 inches long and about 1/16 inches in diameter. It is manipulated by the user who inserts the intake end of the tube into a drop of blood produced by a finger stick. The tube draws a sample of the blood into the tube by capillary action. He then jabs the intake end of the tube into a block of clay so that a portion of the clay enters the intake end of the tube to form a plug which prevents the blood from running out of the tube while it is being carried to the testing machine.

During this action of jamming or jabbing the intake end of the tube into the clay, it has sometimes happened that the tube breaks and forms jagged edges of glass which cut the fingers of the user of the pipet tube. In some cases, the blood sample has been contaminated with AIDS, and the AIDS infection has entered the bloodstream of the user through the cut made by the jagged edges, and given AIDS to the user. The present invention addresses this problem and provides a solution.

BRIEF SUMMARY OF THE INVENTION

The present invention comprises a safety pipet tube which has its outside surface wrapped with layers of a resilient material, such as Mylar flexible polyester film, a polyethylene terephthalate ("PET") supplied by E.I. du Pont de Nemours and Company, or similar material made by I.C.I. and others. The Mylar sheet has an inner adhesive layer which is adhered to the outer surface of the pipet tube, and successive layers of the Mylar sheet are wrapped around and adhered to the outside surface of inner layers of the Mylar sheet.

The method of the invention includes a step of heating the adhesive layer on the Mylar sheet so as to activate the adhesive and make it tacky, and wrapping the Mylar sheet tightly around the tube without the outer edge of the Mylar sheet sticking up loosely and forming what is known as a "flag", where the outer edge of the sheet does not hold down. While pressure sensitive adhesives may be used as the adhesive layer of the sheet, film sheets that are heat shrinkable and also have a pressure sensitive adhesive layer have been found to hold the edge of the sheet down better. Mylar film sheets with a thermoplastic coating layer, a copolyester, are preferred. The preferred adhesive layer is made of a copolyester of the Mylar film that is amorphous instead of crystalline. The Mylar film sheet is supplied as a non-tacky film sheet with no peelable backing layer, and the sheet has an adhesive layer that becomes tacky at about 200° F. and then sticks tenaciously to almost anything.

The invention provides safety micro-pipet tubes which are precision made so as to deliver a precise volume of blood to the testing machine, and yet are inexpensive, and are especially adapted for disposable one-time use.

DETAILED DESCRIPTION

Figure 1:
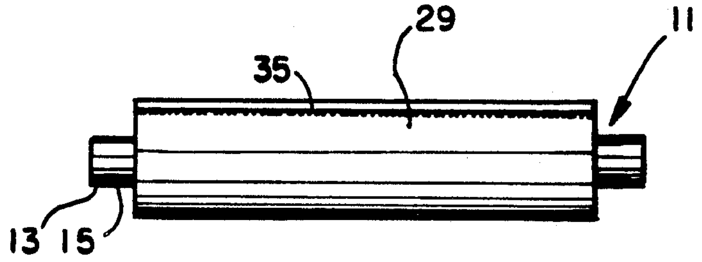
FIG. 1 is a view in side elevation of a pipet tube constructed in accordance with this invention.
Figure 2:
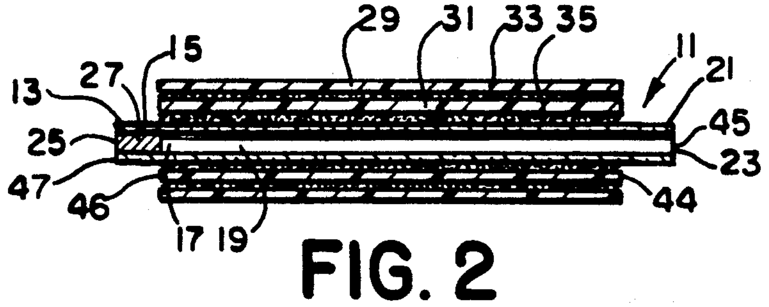
FIG. 2 is a view in vertical section of the pipet tube of FIG. 1.
Figure 3:
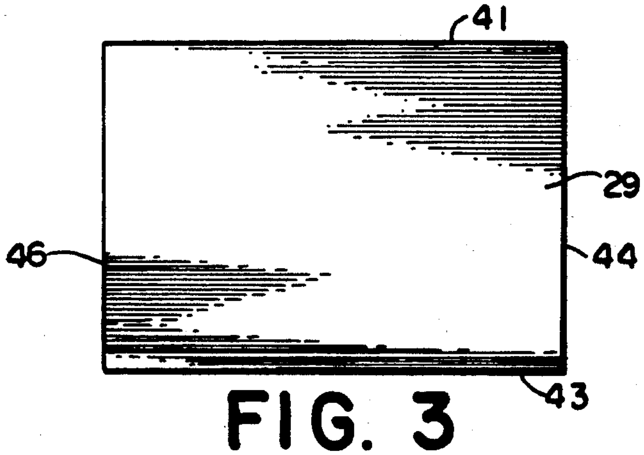
FIG. 3 is a top plan view of a Mylar polyester film sheet adapted for use in the invention.
Figure 4:
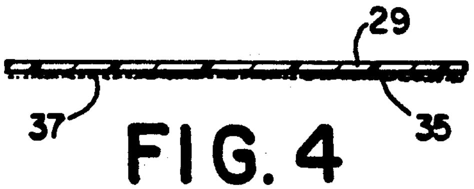
FIG. 4 is a cross section end view in elevation of the sheet of FIG. 3.

Turning to the drawings which are drawn out of proportion to better illustrate the invention, there is shown a pipet tube 11 which is inexpensive precision made to contain a precise volume of blood, and yet is adapted for one-time use and disposal. Pipet tube 11 draws liquid into it by capillary action. For example, when a nurse, doctor or other user wants to obtain a sample of blood for testing, she sticks the finger of the patient with a needle and produces a drop of blood. Then she inserts intake end 13 of the capillary tube 11 into the drop of blood, and capillary action draws the blood into the tube 11.

The pipet tube 11 is made of transparent glass and has an outer surface 15, an axial bore 17 with an inner surface 19, an upper end 21 which is open, and lower intake end 13 which is also open. A vent port 23 is formed at the upper end 21 of the bore 17 for venting air from the tube 11 when blood or other liquid is being drawn into it, and liquid admitting or intake port 25 is formed at the lower end of the bore 17 for admitting liquid into the tube 11.

If glass tube 11 is accidentally broken, it may form jagged edges at the break. For example, a user may break the tube 11 when he jabs the intake end 13 into clay to form a clay plug 27 to hold the blood sample in the bore 17 while the tube is being transported to a testing machine. The blood sample may be contaminated with AIDS or whatever, and may infect the user if he is cut by the jagged edges of the broken tube.

To prevent this, a resilient means is provided to cover the outside surface 15 of the tube, and to cover any jagged edges of a broken tube, to protect the user from being cut by the jagged edges and possibly being infected by the contents of the tube. This resilient means has the characteristic of not breaking when the glass tube is breaking.

The resilient means preferably comprises a sheet 29 of Mylar polyester film, made by the DuPont Company, with an inner layer 31 being wrapped around the outer surface 15 of the tube, and one or more outer layers 33 of the sheet 29 being wrapped around the inner layer 31.

Sheet 29 has a layer of adhesive 35 on its inner surface 37, and sheet 29 is wrapped around the tube 11 so that the adhesive layer 35 contacts and adheres to the outer surface 15 of the tube 11. Adhesive layer 35 may be an amorphous form of Mylar polyester, while sheet 29 is made of the crystalline form so as to provide good adherence between sheet 29 and the tube outer surface 15, and between the layers of sheet 29. Outer layers of the sheet contact and adhere to the outer surface of the inner layers of sheet 29.

Sheet 29 has an inner edge 41, an outer edge 43, an upper edge 44 which may be spaced away from upper edge 45 of tube 11, and a lower edge 46 which may be spaced away from lower edge 47 of tube 11 so that it is easier to jab the tube into clay to form the clay plug 27 in the end of the tube.

The process for making a safety pipet in accordance with this invention comprises the steps of taking an elongated glass tube 11 having an outer surface 15, an axial bore 17 with an inner surface 19, an upper end 21 which is open to the atmosphere, and a lower or intake end 13 which is also open. Then, taking a flexible resilient sheet 29 having a layer 35 of adhesive, and heating the sheet to about 200° F. so that the sheet, which comes in a roll, loses its memory and lies flat with its adhesive side up. Then the tube 11 is rolled over the adhesive layer 35 to wrap the resilient sheet 29 around the outer surface 15 of the tube to form a protective wrapping for the tube, with an inner layer 31 of the sheet 29 being wrapped around the outer surface 15 of the tube 11, and an outer layer 33 of the sheet 29 being wrapped one or more times around the inner layer 31 of the sheet 29. The resilient sheet 29 is sticks to the outer surface 15 of the tube 11 and to the inner layers 31 of the sheet 29. The wrapped tube is allowed to cool to room temperature to set the adhesive.

This process provides a safety glass tube pipet which protects a user from injury and infection should the glass tube 11 break and form jagged edges which could cut the user were it not for the protection provided by the resilient sheet. In addition to providing protection against cutting the user, the resilient sheet also provides added strength to the pipet tube, and this added strength helps to prevent glass tube 11 from breaking.

In operation, blood is drawn by capillary action into the tube 11 from a finger stick drop of blood, and the tube with its sample of blood is jabbed into clay to provide a clay plug 27 in the intake end 13 of the tube 11. If the glass tube 11 breaks despite the added strength provided by the wrapped resilient sheet 29, any jagged glass edges are covered by the resilient sheet 29 to protect the user from being cut and from being infected by the contents of the tube.

Pipet tube 11 is characterized by being capable of drawing blood, or other liquid, into the bore 17 by capillary action from a finger stick drop of blood.

In a preferred form of the inventive pipet tube 11, the tube 11 is 3 inches long, Mylar film sheet 29 is $\frac{3}{4}$ inches long, the bore 17 has a capacity of not more than two milliliters and an outside diameter of about 0.060 inches (60 thousandths), and the tube 11 is transparent so that the user can see the level of blood in the tube. The bore has a uniform diameter. The clay plug 27 is about $\frac{1}{8}$ inches long. Mylar sheet 29 is about 0.007 inches thick (0.7 thousandths) and adhesive layer 35 is about 0.00005 inches thick (0.05 thousandths), and it is preferred to wrap the sheet around the tube 3 or 4 times. The preferred range of thickness of sheet 29 is 1 mil to 0.4 mil (1 thousandth to 0.4 thousandth of an inch).

The wrapped safety tube of this invention eliminates sharp edges when the glass tube is broken, and the film sheet wrapping also holds the blood sample, though some blood may ooze out through the interstices in the sheet.

Capillary action holds the blood sample tube until the end of the tube is jabbed into a clay to form a clay plug.

As an example, the tube 11 is prepared by cutting it to a 3 inch length, printing a colored band on it to indicate whether the tube has been treated with an anticoagulant or not, and both ends of the tube are flamed treated to smooth those ends. Optionally, an anticoagulant coating is applied to the inside surface of the tube.

The sheet 29 is heated until the adhesive layer becomes tacky, which occurs at about 200° F. This application of heat flattens the sheet which tends to curl because it is taken from a roll. Then the tube 29 is rolled over the adhesive layer to wrap the sheet around the tube and form a protective wrapping with the inner layer of the sheet 29 wrapped around the outer surface of the tube and three outer layers wrapped around the inner layer. The wrapped tube is allowed to cool to room temperature to adhere the resilient sheet to the tube and the inner layers of the sheet.

I claim:

1. A disposable one-time use, inexpensive, capillary-action safety micro-pipet tube for containing a sample of blood or other liquid, comprising a transparent glass tube having an outer surface, an axial bore with an inner surface, and upper and lower ends which are open, a vent port at the upper end of the bore for venting air from the tube, a liquid admitting port at the lower end of the bore for admitting liquid to the tube, said tube being constructed and arranged for drawing a liquid into the bore by capillary action, said glass tube forming jagged edges if accidentally broken, said tube being for the containment of blood, or other liquid, which may be contaminated and infectious, and resilient means for covering the outer surface of the tube and any jagged edges of a broken tube and for holding the tube together and holding the blood in the tube and preventing said blood from escaping from any jagged edges of a broken tube, said capillary-action safety tube being expendable after a single use, whereby when blood is drawn by capillary action into the tube from a finger stick drop of blood, and the tube containing the blood is jabbed into clay to provide a clay plug in the liquid admitting port of the tube, if the glass tube breaks, the jagged glass edges are covered by the resilient covering means, the tube is held together, and the blood is held in the tube and is prevented from escaping by the covering means.

2. A safety pipet tube for containing a sample of blood or other liquid, comprising a glass tube having an outer surface, an axial bore with an inner surface, and upper and lower ends which are open, a vent port at the upper end of the bore for venting air from the tube, a liquid admitting port at the lower end of the bore for admitting liquid to the tube, said glass tube forming jagged edges if accidentally broken, said tube being for the containment of blood, or other liquid, which may be contaminated and infectious, and resilient means for covering the outer surface of the tube and any jagged edges of a broken tube and for holding the tube together and holding the blood in the tube and preventing said blood from escaping from the tube.

3. The safety pipet tube of claim 2, said resilient means being a sheet of polyester film wrapped around the tube with an inner layer being wrapped around the outer surface of the tube and an outer layer of the sheet being wrapped around the inner layer of the sheet.

4. The safety pipet tube of claim 3, said sheet having a layer of adhesive on the inner surface of the sheet with the sheet being wrapped around the tube so that the adhesive layer contacts and adheres to the outer surface of the tube and to the outer surface of successive layers of the sheet.

5. The safety pipet tube of claim 4, said layer of adhesive being a co-polyester of the polyester sheet.

6. The safety pipet tube of claim 5, the polyester film sheet being crystalline in form, and the polyester adhesive sheet being amorphous in form.

7. The safety pipet tube of claim 3, said sheet having upper and lower edges which are spaced away from the upper and lower edges of the tube to make it easier to jab the tube into clay to form a clay plug in the end of the tube.

8. The safety pipet tube of claim 3, said sheet being made of polyethylene terephthalate film.

9. The safety pipet tube of claim 2, said tube being constructed and arranged for drawing blood into the bore by capillary action from a finger stick drop of blood.

10. A safety pipet tube for containing a sample of blood or other liquid, comprising a glass tube having an outer surface, an axial bore with an inner surface, and upper and lower ends which are open, a vent port at the upper end of the bore for venting air from the tube, a liquid admitting port at the lower end of the bore for admitting liquid to the tube, said glass tube forming jagged edges if accidentally broken, said tube being for the containment of blood, or other liquid, which may be contaminated and infectious, and resilient means for covering the outer surface of the tube and any jagged edges of a broken tube and for holding the tube together, for holding the blood in the tube and preventing said blood from escaping, said resilient means being a sheet of polyester film wrapped around the tube with an inner layer being wrapped around the outer surface of the tube and an outer layer of the sheet being wrapped around the inner layer of the sheet, said sheet having a layer of adhesive on the inner surface of the sheet with the sheet being wrapped around the tube so that the adhesive layer contacts and adheres to the outer surface of the tube and to the outer surface of successive layers of the sheet, said sheet having upper and lower edges which are spaced away from the upper and lower edges of the tube for easier insertion of the end of the tube into clay, said tube constructed and arranged for drawing blood into the bore by capillary action from a finger stick drop of blood, said sheet being made of polyethylene terephthalate film, said layer of adhesive being a co-polyester of the film sheet, the sheet being crystalline in form, the polyester adhesive sheet being amorphous in form, the ends of the tube being fire-polished, said bore having a capacity of not more than 2 milliliters and an outside diameter of about ¼ millimeter, said tube being transparent to show the level of the blood in the tube, said bore having a uniform diameter, whereby when blood is drawn by capillary action into the tube from a finger stick drop of blood, and the tube containing the blood is jabbed into a clay to provide a clay plug in the liquid admitting port of the tube, if the glass tube breaks, the jagged glass edges are covered by the resilient covering means to hold the blood in the broken tube.

11. A process for preventing contamination by the contents of a broken capillary tube comprising the steps of providing an elongated capillary tube having an outer surface, an axial bore with an inner surface, upper and lower ends which are open, and means for drawing liquid into the tube by capillary action, forming a resilient sheet on the outer surface of the tube by wrapping layers of a polyester film sheet around the tube, breaking the tube, covering any jagged edges of the broken tube with the resilient sheet, holding the broken tube together with the resilient sheet, and holding said liquid within the resilient sheet to prevent said liquid from escaping from the broken tube.

* * * * *